United States Patent
Kumaran et al.

(10) Patent No.: US 10,891,295 B2
(45) Date of Patent: Jan. 12, 2021

(54) METHODS AND SYSTEMS USING LINEAR EXPRESSIONS FOR MACHINE LEARNING MODELS TO RANK SEARCH RESULTS

(71) Applicant: Apple Inc., Cupertino, CA (US)

(72) Inventors: Saravana Kumar Siva Kumaran, Fremont, CA (US); Kevin Hsu, Pleasanton, CA (US); Hua Ouyang, San Jose, CA (US); Ling Wang, Foster City, CA (US)

(73) Assignee: Apple Inc., Cupertino, CA (US)

( * ) Notice: Subject to any disclaimer, the term of this patent is extended or adjusted under 35 U.S.C. 154(b) by 258 days.

(21) Appl. No.: 15/802,161

(22) Filed: Nov. 2, 2017

(65) Prior Publication Data
US 2018/0349382 A1 Dec. 6, 2018

Related U.S. Application Data

(60) Provisional application No. 62/514,917, filed on Jun. 4, 2017.

(51) Int. Cl.
*G06F 16/2457* (2019.01)
*G06F 17/12* (2006.01)
*G06N 20/00* (2019.01)
*G06F 16/951* (2019.01)
*G06N 5/00* (2006.01)

(52) U.S. Cl.
CPC ...... *G06F 16/24578* (2019.01); *G06F 16/951* (2019.01); *G06F 17/12* (2013.01); *G06N 5/003* (2013.01); *G06N 20/00* (2019.01)

(58) Field of Classification Search
CPC .. G06F 16/24578; G06F 16/951; G06F 17/12; G06N 20/00; G06N 5/003
USPC .......................................................... 707/723
See application file for complete search history.

(56) References Cited

U.S. PATENT DOCUMENTS

| | | | | |
|---|---|---|---|---|
| 2012/0323906 | A1* | 12/2012 | Fan | G09B 7/00 707/723 |
| 2014/0006012 | A1* | 1/2014 | Zhou | G06F 16/3344 704/9 |
| 2016/0162793 | A1* | 6/2016 | Wang | G06F 16/24578 706/12 |
| 2017/0004455 | A1* | 1/2017 | Tang | G06F 16/2246 |
| 2017/0004487 | A1* | 1/2017 | Hagen | G06Q 20/4016 |

* cited by examiner

*Primary Examiner* — Alicia M Antoine
(74) *Attorney, Agent, or Firm* — Jaffery Watson Mendonsa & Hamilton LLP

(57) ABSTRACT

Methods and systems are disclosed using linear expressions for machine learning (ML) models for ranking search results. In one example, a method for a computer trains a ML model into a decision tree for ranking search results. The decision tree is converted into a linear expression including Boolean terms. The linear expression is transmitted to one or more search computers that use the linear expression to rank search results for a search query. According to another example, a method for a computer having a search engine includes receiving a linear expression including Boolean terms representing a decision tree. The search engine processes a search query and uses the linear expression to rank search results for the search query.

17 Claims, 13 Drawing Sheets

Linear Expression 607

[(0.7) x (BMI > 20) x (Height < 135) + (0.1) x (BMI > 20) x (Height >= 135)+
(0.4) x (BMI <= 20) x (Height > 170) + (0.2) x (BMI <= 20) x (Height <= 170)]

| Rank 711 | Feature Tree Values 712 | | | Score 713 |
|---|---|---|---|---|
| | P | M | T | |
| 1 | 12 | 2.4 | 0.9 | 15.3 |
| 2 | 2.1 | 4.0 | 0.0 | 6.1 |
| 3 | 1.0 | 1.0 | 0.0 | 2 |

METHODS AND SYSTEMS USING LINEAR
EXPRESSIONS FOR MACHINE LEARNING
MODELS TO RANK SEARCH RESULTS

PRIORITY

This application claims priority and the benefit of U.S. Provisional Patent Application No. 62/514,917, entitled "METHODS AND SYSTEMS USING LINEAR EXPRESSIONS FOR MACHINE LEARNING MODELS TO RANK SEARCH RESULTS," filed on Jun. 4, 2017, which is commonly assigned and incorporated herein by reference.

FIELD

The present invention relates generally to data processing for search results and, more particularly, to methods and systems using linear expressions for machine learning (ML) models to rank search results.

BACKGROUND

Search engines are provided by search servers across networks all over the world. When a user inputs a search query into a search engine, the search engine will check the query against massive number of indexed pages in documents and will rank the results accordingly using complex ranking algorithms in order to provide quick results. Often times, the ranking algorithms may need to be modified or adjusted, and, in doing so, a search engine has to be altered to make the adjustments. If the search engines use different programming languages and platforms across multiple servers or computers, adjusting the search engines accordingly can become complex and resource intensive.

SUMMARY

Methods and systems are disclosed using linear expressions for machine learning (ML) models for ranking search results. According to one example, a method for a computing device or computer includes training a machine learning (ML) model into a decision tree for ranking search results. The decision tree is converted into a linear expression including Boolean terms. The linear expression is transmitted to one or more search computers. In one example, the ML model and decision tree are modified. The modified decision tree is converted into a modified linear expression. The modified linear expression is transmitted to the one or more search computers. The one or more search computers can use the linear expression or modified linear expression to rank search results. In one example, the decision tree or modified decision tree includes one or more nodes, and each node is associated with one or more features. The linear expression or modified linear expression represents the decision tree or modified decision tree.

According to another example, a method for a search server having a search engine includes receiving a linear expression including Boolean terms representing a decision tree. The search query is processed by the search engine using the linear expression representing the decision tree to rank search results for the search query. In one example, a modified linear expression including Boolean terms is received representing a modified decision tree. A search query is processed by the search engine using the modified linear expression representing the modified decision tree to rank search results for the search query. A score can be calculated for the linear expression or modified linear expression. The linear expression or modified linear expression can be ranked based on the score. The search results can be ranked based on the ranked linear expression or modified linear expression.

According to another example, a computing system includes a network interface, a memory, and a processor. The memory stores linear expressions representing decision trees. The processor is coupled to the memory and network interface and configured to transmit the linear expressions from the network interface to a search engine, wherein the search engine is to use the linear expressions to rank search results of a search query. The processor can be further configured to train one or more machine learning (ML) models to generate the decision trees and convert the decision trees to the linear expressions. In one example, the processor is further configured to modify one or more ML models to generate modified decision trees and convert the modified decision trees to modified linear expressions. The processor can be further configured to transmit the modified linear expressions to the search engine, wherein the search engine is to use the modified linear expressions to rank search results of a search query. The decision trees or modified decision trees include one or more nodes, and each node is associated with one or more features. The linear expressions or modified linear expressions represent the decision trees or modified decision trees.

According to another example, a search server having a search engine includes means for receiving a linear expression including Boolean terms representing a decision tree, and means for processing a search query by the search engine using the linear expression representing the decision tree to rank search results for the search query. The search server can further include means for receiving a modified linear expression including Boolean terms representing a modified decision tree, means for processing a search query by the search engine using the modified linear expression representing the modified decision tree to rank search results for the search query. The search server can further include means for calculating a score for the linear expression or modified linear expression, means for ranking the linear expression or modified linear expression based on the score. The search results are ranked based on the ranked linear expression or modified linear expression.

According to another example, a non-transitory machine-readable medium, includes instructions, which if executed by a data processing system, causes the data processing system to perform a method comprising training a machine learning (ML) model into a decision tree for ranking search results, converting the decision tree into a linear expression including Boolean terms, and transmitting the linear expression to one or more computers. The data processing system can also modify the ML model and decision tree, convert the modified decision tree into a modified linear expression, and transmit the modified linear expression to one or more computers.

In the disclosed examples, because the linear expression includes Boolean terms, the computers can input the linear expression directly into the search engines to rank search results without having to modify the search engines or programs. The linear expressions are program agnostic in which the linear expressions including Boolean terms can be used by any type of search engine program regardless of programming language to run. In one example, the linear expressions are essentially a variable string including Boolean terms that can be converted into a decision tree. By transmitting linear expressions, a decision tree can be modified by search engines at the computers in a simple way without remodifying the search engines thereby saving resources.

Other methods and systems for using linear expressions for machine learning modes to rank search results are described.

BRIEF DESCRIPTION OF THE DRAWINGS

The present invention is illustrated by way of example, and not limitation, in the figures of the accompanying drawings, in which like references indicate similar elements.

DETAILED DESCRIPTION

Various examples, embodiments and aspects will be described with reference to details discussed below, and the accompanying drawings will illustrate the various examples and embodiments. The following description and drawings are illustrative and are not to be construed as limiting. Numerous specific details are described to provide a thorough understanding of various embodiments. In certain instances, well-known or conventional details are not described in order to provide a concise discussion of the examples and embodiments.

Reference in the specification and detailed description to an "example" or "embodiment" means that a particular aspect, feature, structure, or characteristic described in conjunction with the example or embodiment can be included in at least one example and embodiment. The appearances of the phrase "in one example" or "in one embodiment" in various places in the specification do not necessarily all refer to the same embodiments. The processes depicted in the figures that follow can be performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Examples and embodiments disclosed herein build and train machine learning(ML) models to generate decision trees to rank search results. The decision trees can be represented by linear expressions including Boolean terms and transmitted to one or more computers. In one example, the computers receive the linear expressions and pass them directly to search engines that implement the linear expressions in ranking algorithms without having to modify the ranking algorithms or search engines or programs. In one example, linear expressions are variable strings with Boolean terms that can be input to any type of program or algorithm. As such, the linear expressions are program agnostic. In other examples, if a decision tree is modified, a linear expression can be modified and transmitted to one or more computers and use the modified linear expression to rank search results.

Figure 1:
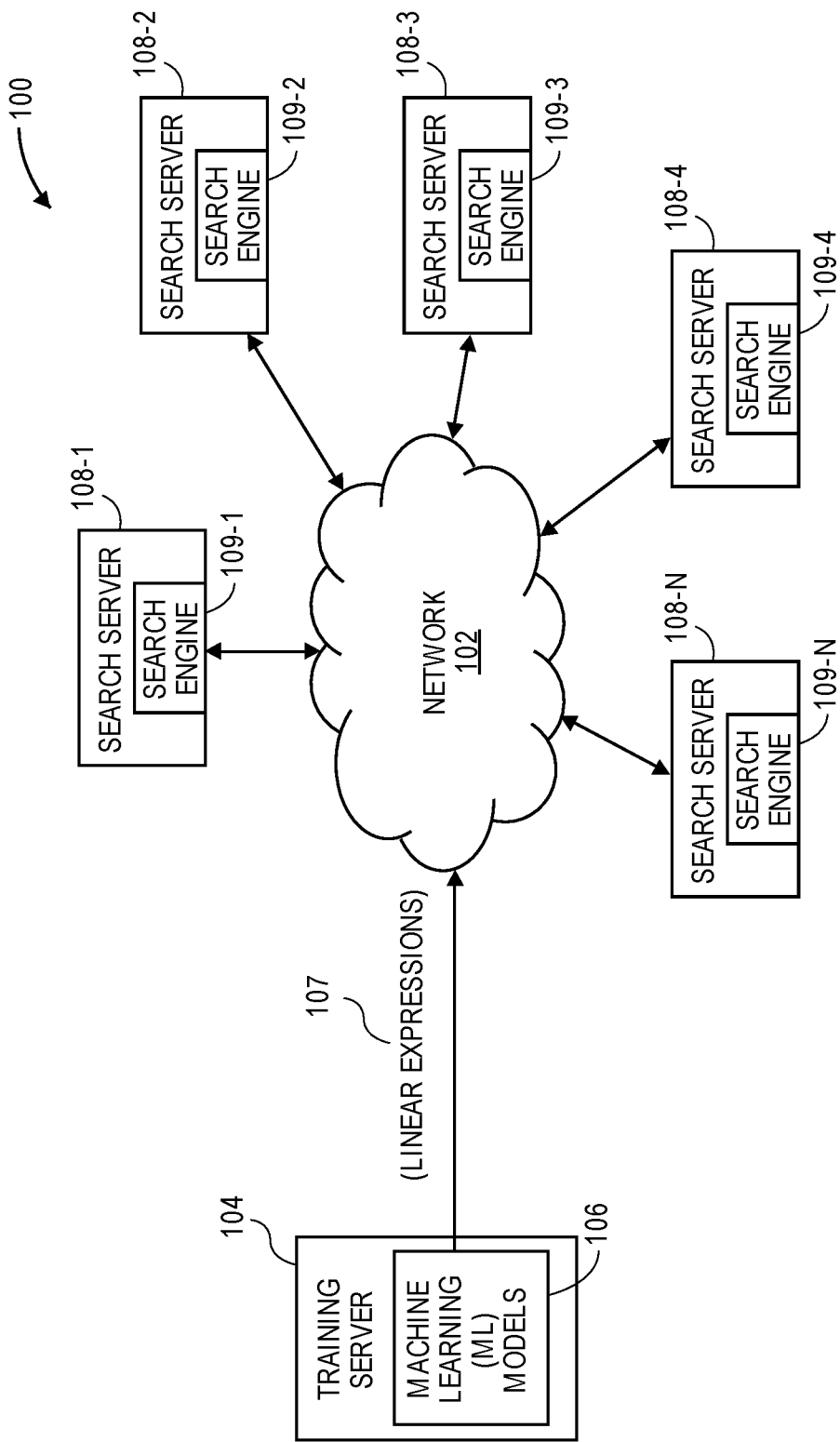
FIG. 1 is one example of a system of interconnected servers using linear expressions for search engines.

FIG. 1 is one example of a system 100 of interconnected servers or computers using linear expressions for search engines. Network 102 interconnects training server (or computer) 104 and search servers (or computers) 108-1 through 108-N. Network 102 can be a wide area network (WAN) including the Internet or a local area network (LAN), which can provide IEEE 802.11 wired or wireless communication or any combination of thereof. Training server 104 can be located at any data center (e.g., a core data center) or a training facility to build machine learning (ML) models 106 generating decision trees used for ranking search results. For example, ML models 106 can be based on any type of ML model including Gradient Boosting Decision Tree (GBDT) models, linear regression models or logistic regression models in generating decision trees that can predict a target result or provide a target value based on any number of input features at nodes of the tree providing classification labels. ML models can be generated on any type of computing device or computer such as a server, battery powered mobile device or client computer. Linear expressions can be received and used by any server, battery powered mobile device or client computer.

Decision trees can be represented as linear expressions 107 including Boolean terms as described in FIGS. 4A-4B, 5A-5B, 6A-6B and 7A-7J. In one example, linear expression 107 includes integer constants, variables, algebraic operations including addition, subtraction, multiplication, division, etc. and Boolean terms having only two values such as "True" or "False" or "Yes" or "No" or terms indicating true or false. In the following examples if a Boolean term is determined "True", the Boolean term has a value of "1" in the linear expression. If the Boolean term is determined "False", the Boolean term has a value of "0" in the linear expression. In one example, when ML models and decision trees are adjusted, training server 104 can modify linear expressions 107, accordingly, which represent the decision trees. Training server 104 can then transmit the linear expressions 107 representing decision trees or modified decision trees to any number of search servers 108-1 through 108-N via network 102.

In one example, search servers (or computers) 108-1 through 108-N are located across one or more networks and, in other examples, on or more search servers 108-1 through 108-N can be in the same network. Each of the search server 108-1 through 108-N includes a respective search engine 109-1 through 109-N, which can crawl the Internet for content, build indices, and provide user with ranked search results using ML models and decisions trees as described herein. In one example, search servers 108-1 through 108-N receive linear expressions 107 from training server 104 for search engines 109-1 through 109-N. In one example, search engines 109-1 through 109-N can rebuild decision trees using the received linear expressions 107 or pass the linear expressions directly into ranking algorithms to rank search results for a search query. Search engines 109-1 through 109-N can provide top 5 or top 3 results using the decision trees represented by the linear expressions. In the following examples, because linear expressions 107 include linear input and Boolean terms, search engines 109-1 through 109-N can input linear expressions 107 directly into their ranking algorithms to rank search results without having to modify the search engines or programs.

Figure 2:
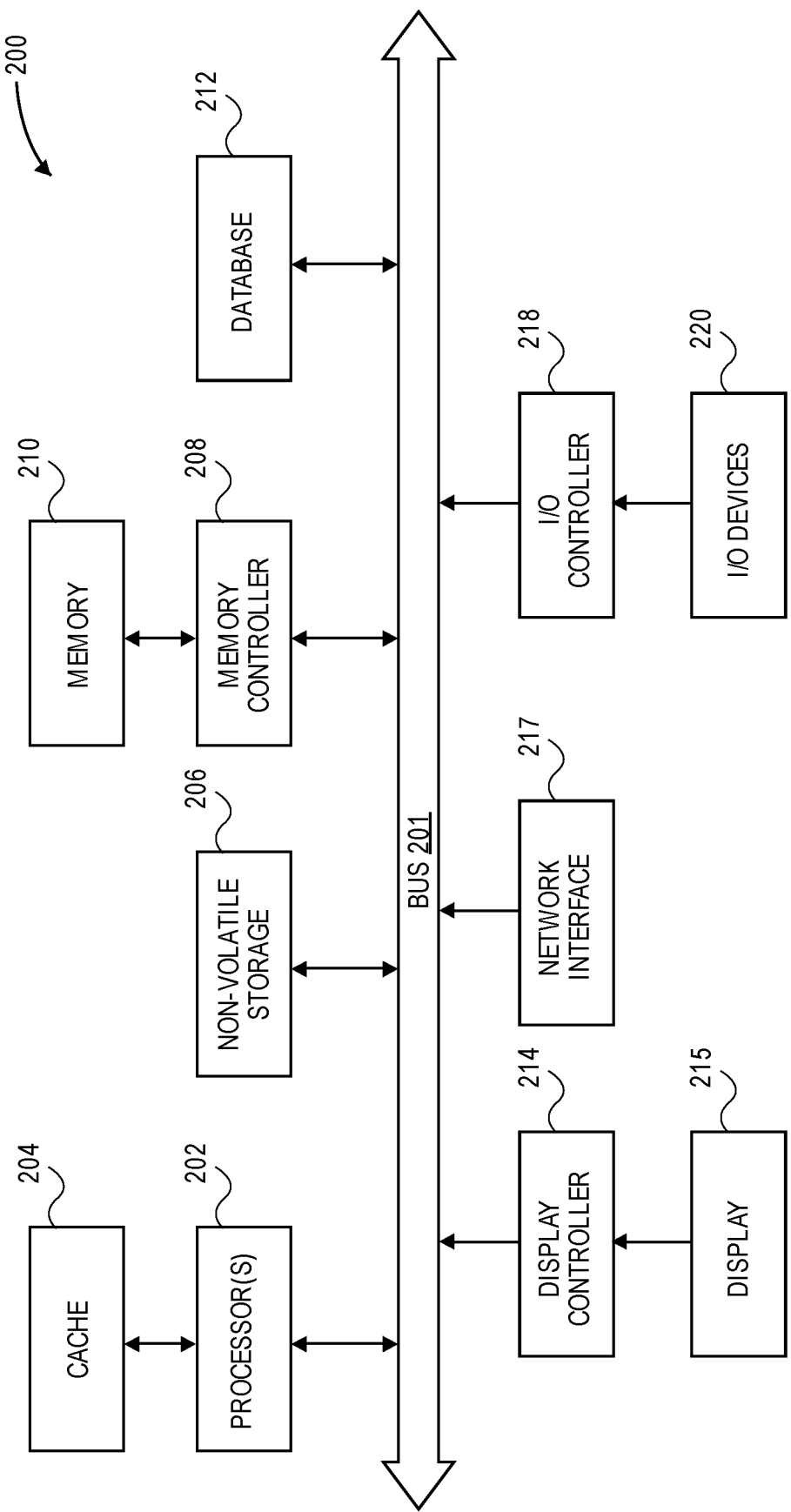
FIG. 2 is one example of a block diagram of a data processing or computing system for components of a server or computer in FIG. 1.

FIG. 2 is one example of a block diagram 200 of exemplary components for a data processing system or computing system which can represent a server or computer (e.g., training server 104 or search servers 108-1 through 108-N) in FIG. 1. Although FIG. 2 illustrates various components of data processing or computing system, the components are not intended to represent any particular architecture or manner of interconnecting the components, as such details are not germane to the examples or embodiments. Network computers and other data processing systems or other consumer electronic devices, which have fewer components or perhaps more components, may also be used with the disclosed examples and embodiments.

Referring to FIG. 2, server 200, which is a form of a data processing or computing system, includes a bus 201, which is coupled to processor(s) 202 coupled to cache 204, display controller 214 coupled to a display 215, network interface 217, non-volatile storage 206, memory controller 208 coupled to memory 210, I/O controller 218 coupled to I/O devices 220, and database 212. Processor(s) 202 can include one or more central processing units (CPUs), graphical processing units (GPUs), a specialized processor or any combination thereof. Processor(s) 202 can retrieve instructions from any of the memories including non-volatile storage 206, memory 210, or database 212, and execute the instructions to perform operations described in the disclosed examples and embodiments.

Examples of I/O devices 220 include mice, keyboards, printers and other like devices controlled by I/O controller 218. Network interface 217 can include modems, wired and wireless transceivers and communicate using any type of networking protocol including wired or wireless WAN and LAN protocols. Memory 210 can be any type of memory including random access memory (RAM), dynamic random-access memory (DRAM), which requires power continually in order to refresh or maintain the data in the memory. Non-volatile storage 206 can be a mass storage device including a magnetic hard drive or a magnetic optical drive or an optical drive or a digital video disc (DVD) RAM or a flash memory or other types of memory systems, which maintain data (e.g. large amounts of data) even after power is removed from the system.

Database 212 is used by server 200 and can store massive amounts of data including indexing data used by search engines 109-1 through 109-N. Database 212 can also store ML models and decision trees for ranking algorithms, which can be created by receiving linear expressions 107 in FIG. 1 using techniques disclosed in FIGS. 3A-8. Although database 212 is shown coupled to system bus 201, server 200 can be coupled to any number of external databases locally or remotely connected to server 200 via network interface 217. In one example, server 200 can implement search engines 109-1 through 109-N of FIG. 1 using linear expressions 107 and rank search results using data or indices stored in database 212.

Figure 3A:
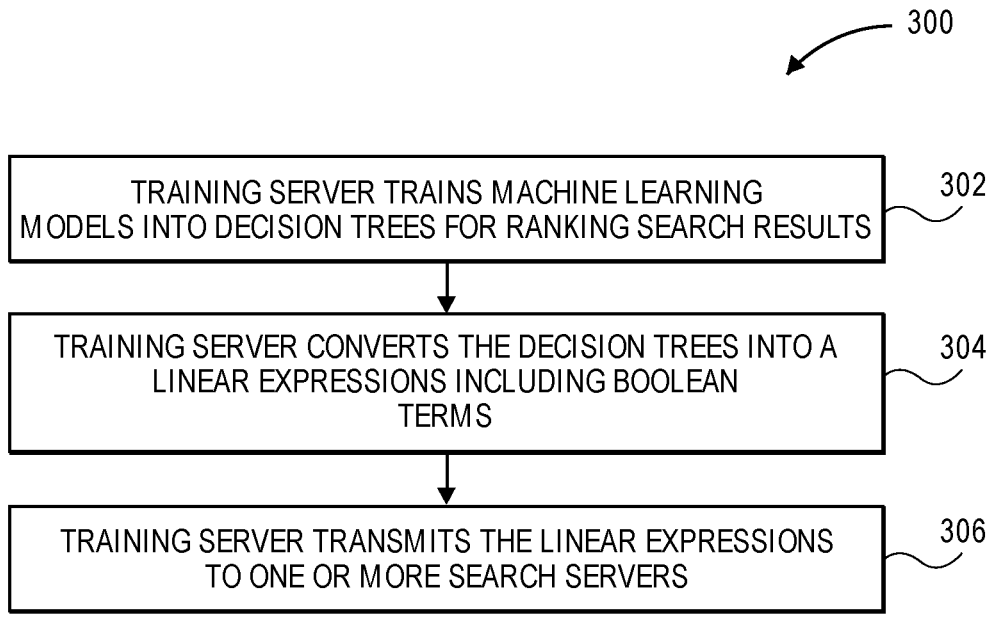
FIG. 3A is one example operation by a training server to transmit linear expressions.

FIG. 3A is one example operation 300 by a training server (e.g., training server 104) to transmit linear expressions (e.g., linear expressions 107). Referring to FIG. 3A, operation 300 includes operations 302, 304 and 306. At operation 302, a training server trains a ML model into decision trees for ranking search results. For example, training server 104 can train ML models into decision trees as described in FIGS. 4A-4B, 5A-5B, 6A-6B and 7A-7J. At operation 304, the training server converts the decision trees into linear expressions including Boolean terms. For example, training server 104 can generate linear expressions from a trained ML model as described herein and in FIGS. 5B and 6B. At operation 306, the training server transmits the linear expressions to one or more search servers which can use the linear expressions to rank search results for a user search query. For example, training server 104 can transmit linear expressions 107 to any of the search engines 109-1 through 109-N of search servers 108-1 through 108-N. If a ML model or decision tree is updated or modified, training server 104 can send an updated linear expression to the search engines of the search servers which can input the updated linear expressions into the ranking algorithms of the search engines.

Figure 3B:
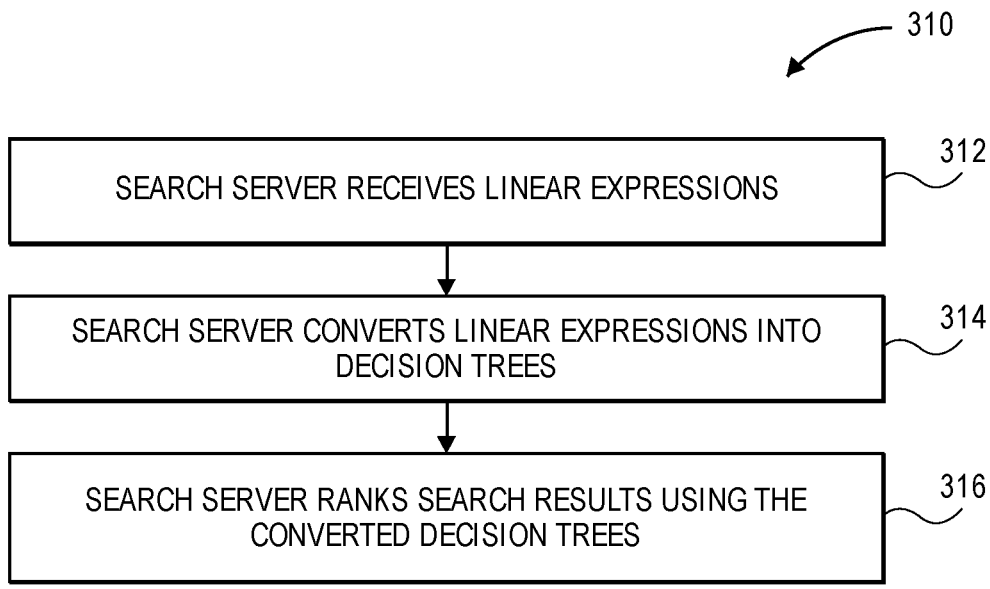
FIG. 3B is one example operation by a server or computer to use the linear expressions from a training server or computer for ranking search results by a search engine.

FIG. 3B is one example operation 310 by a search server (e.g., search servers 108-1 through 108-N) to use linear expressions (e.g., linear expressions 107) from the training server (e.g., training server 104) for ranking search results by a search engine (e.g., search engines 109-1 through 109-N). Referring to FIG. 3B, operation 310 includes operations 312, 314 and 316. At operation 312, a search server receives linear expressions from a training server. For example, any of the search servers 108-1 through 108-N can receive linear expressions 107 from training server 104 and pass them to ranking algorithms of search engines 109-1 through 109-N. At operation 314, the search server can convert the linear expressions into decision trees used by ranking algorithms. At operation 316, the search server ranks search results using the decision trees converted from the linear expressions. In other examples, the search engines can use the linear expressions directly for their ranking algorithms as the linear expressions represent decision trees.

Figure 4A:
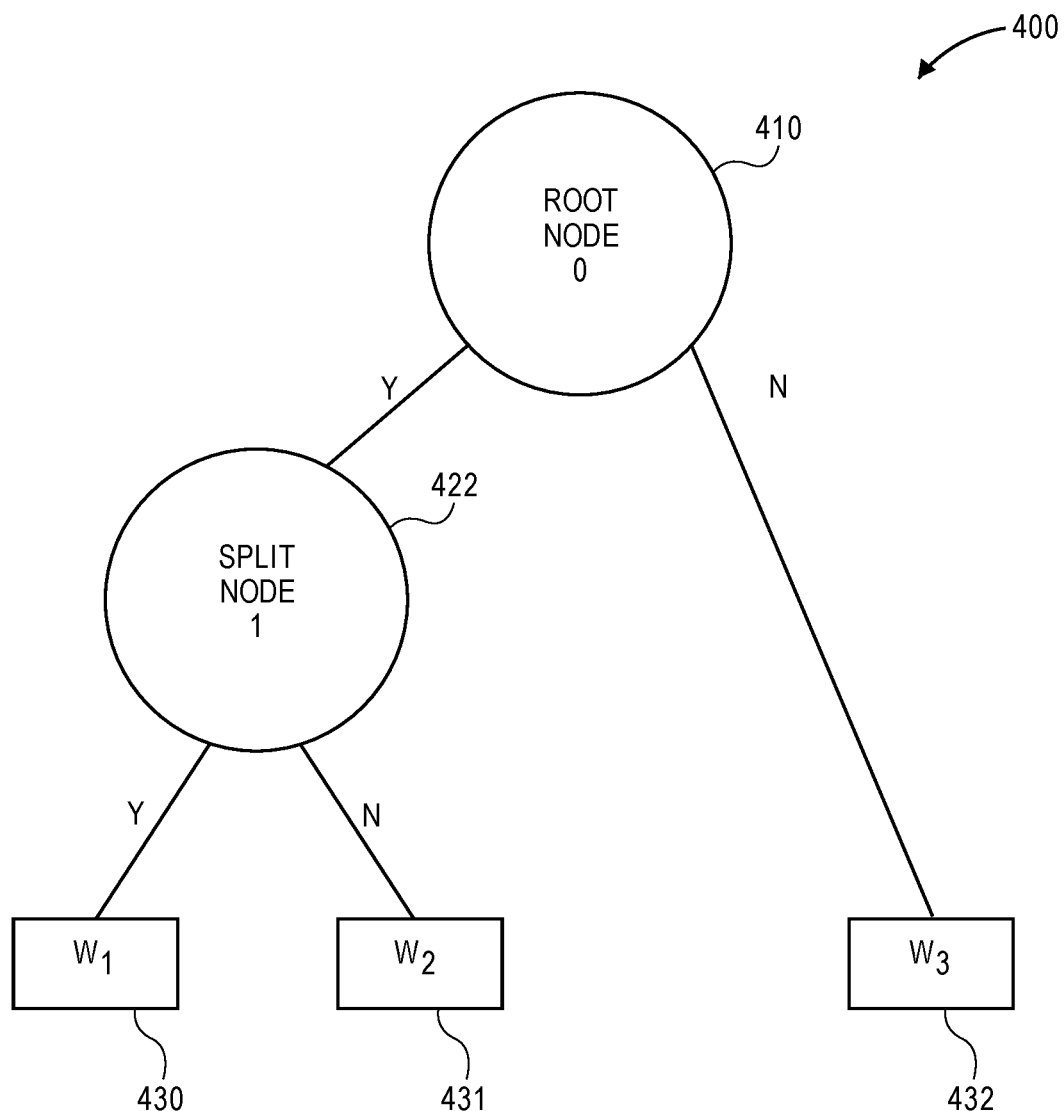
FIGS. 4A-4B are examples of decision trees that can be represented by linear expressions.
Figure 4B:
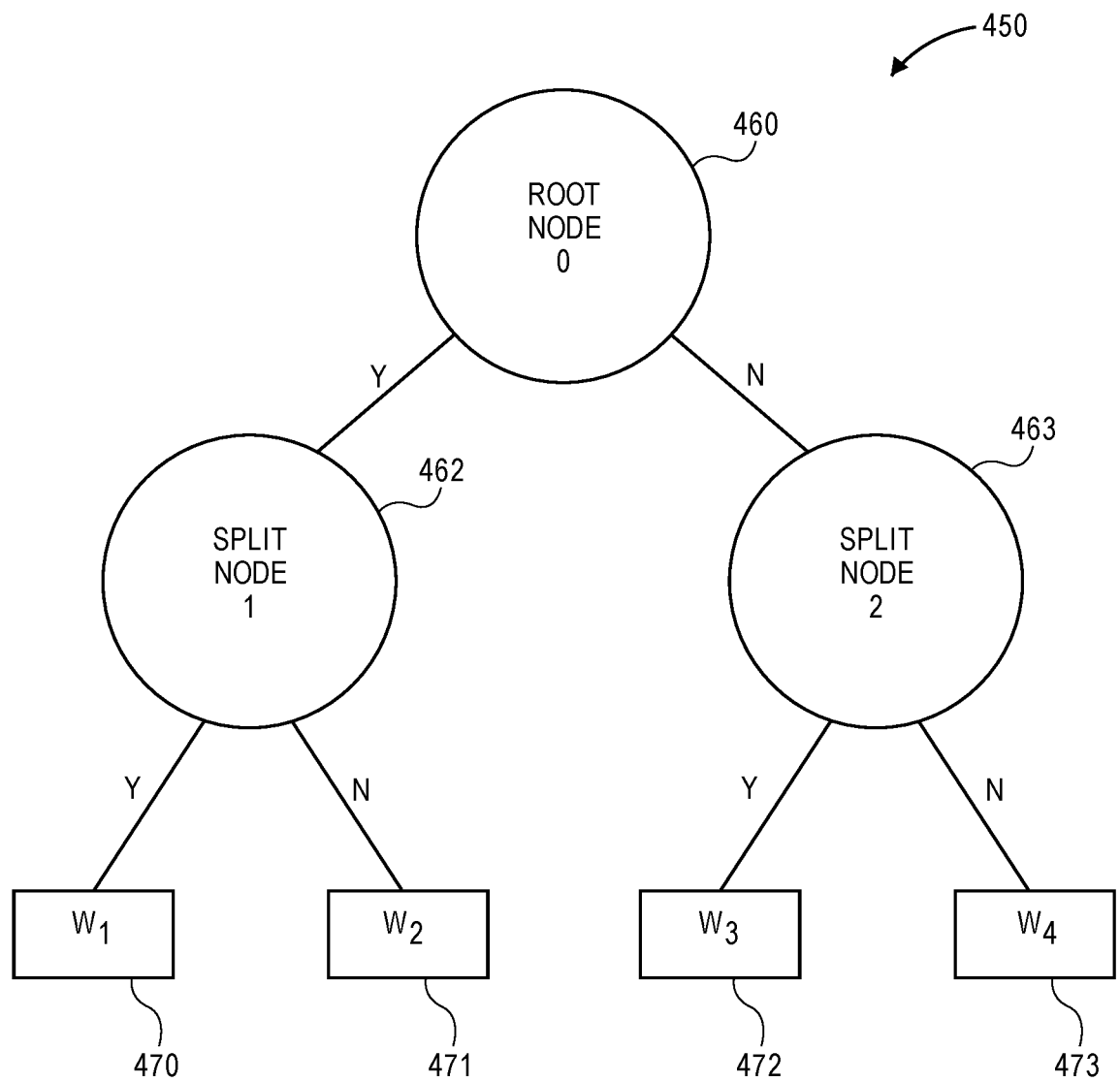

FIGS. 4A-4B are examples of decision trees that can be represented by linear expressions. A decision tree is sample representation for classifying examples, which includes a root node and one more split-nodes or leave nodes. Each split-node can have branches to other split-nodes until a final layer of split-nodes. At each node, a feature can be used to label a classification, e.g., body mass index (BMI)>20, in which the decision tree is to determine the health of a given sample. The result of the final split-nodes or leaf nodes can provide a prediction result or prediction value referred to as weights.

For example, referring to FIG. 4A, a ML model can be trained out of a sample, e.g., 100 people, to generate an exemplary decision tree 400 to predict the number of healthy people. Decision tree 400 can have a root node 0 (410) including the feature "BMI>20" and can have branches yes (Y) or no (N). In this example, the feature BMI>20 is a Boolean term having a true (Y) or false (N) outcome. For the N branch from root node 0 (410), people can be classified as healthy given a weight value e.g., 0.2 indicating 20 percent of the people are classified as (BMI<=20) and are healthy. For the Y branch from root node 0, there can be a split-node 1 (422) or leaf node with another feature "Weight>80 kg" (or Boolean term) having branches Y or N from split node 1 (422). For the Y branch from split node 1, a weight value of 0.7 can be provided indicating 70 percent of the people are classified as (BMI>20)(Weight>80 kg) which can indicate overweight and not healthy. For the N branch from split node 1, a weight value of 0.1 can be provided indicating 10 percent of the people are classified as (BMI>20) (Weight<=80 kg) and healthy.

This decision tree can be represented as a linear expression where weight values are $W_1$=0.7, $W_2$=0.1 and $W_3$=0.2 (430 through 432) and the linear expression is: (0.2)× (BMI<=20)+(0.7)×(BMI>20)(Weight>80 kg)+(0.1)× (BMI>20)(Weight<=80 kg). For the linear expression, if the Boolean term is True (Y), it is given a value of 1, and if the Boolean term is False (N), it is given a value of 0. In this way, traversing a decision tree represented by the linear expression would lead to a single weight value depending on the value of the Boolean terms. In one example, the linear expression can be represented as a string including number values, variables and Boolean terms. In other examples, as described in FIGS. 7A-7J, the linear expressions can relate to scoring webpages or documents in order to rank search results. Such a linear expression can be transmitted to a search engine of a search server and directly input to ranking algorithms used to rank search results without modification to the search engines or ranking algorithms which can simply input the string of number values, variables and Boolean terms. In other examples, the training ML model can change at the training server and features can change, e.g., the feature BMI>20 can change to BMI<20, and the split nodes, branches and weight values can change accordingly. In such a case, the linear expressions can be modified to adjust for the changes sent to a search engine and can be input into the search engine ranking algorithms.

Figures 6A, 6B:
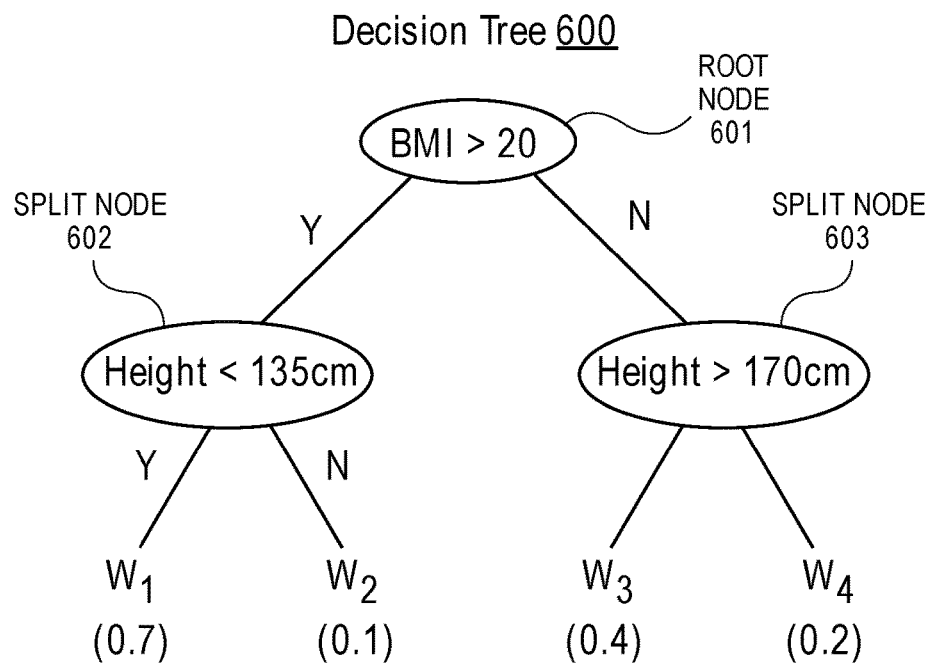
FIG. 6A is one example of a decision tree with exemplary features and weight values.
FIG. 6B is one example of a linear expression for the exemplary decision tree of FIG. 6A.

Referring to FIG. 4B, in one example, instead of one split-node, decision tree 450 includes a root node 0 (460) and two split-nodes—split node 1 (462) and split node 2 (463). The branches of split nodes 1 and 2 can provide weight values $W_1$ through $W_4$ (470 through 473). Example features for the root nodes and split nodes are shown in FIG. 6A. Referring to FIG. 6A, a decision tree 600 has two split nodes 602 and 603. At root node 601, the Boolean feature term "BMI>20" is used with two branches Y or N. If true (Y), root node 601 branches to split node 602, which has the Boolean feature term "Height<135 cm." If true (Y), split node 602 provides a weight ($W_1$) value of 0.7, which can provide a confidence level or a prediction result classification, e.g., 70% of the sample of 100 people are (BMI>20) (Height<135 cm). If false (N), split node 602 provides a weight ($W_2$) value of 0.1, which can indicate that 10% of the sample are (BMI>20)(height>=135 cm). At split node 603, if Y and height>170 cm, split node 603 can provide a weight ($W_3$) value of 0.4 indicating 40% of the sample are (BMI<=20)(height>170 cm). And if N and height is <170 cm split node 603 provides a weight ($W_4$) value of 0.2 indicating the 20% of the sample is (BMI<=20) (Height<=170 cm). Decision tree 600 can be represented by the linear expression 607 as shown in FIG. 6B as [(0.7)× (BMI>20)×(Height<135)+(0.1)×(BMI>20)× (Height>=135)+(0.4)×(BMI<=20)×(Height>170)+(0.2)× (BMI<=20)×(Height<=170). In this example, if a Boolean term is True it will have a value of 1 and if False it will have a value of 0, and decision tree 600 is a single tree in which a decision will traverse the tree to a single weight, e.g., $W_1$ to $W_4$. A score can be determined by one of the weights $W_1$, $W_2$, $W_3$, or $W_4$ in which one of the weight values will be obtained based on traversing the decision tree 600 and the other values will equal zero as the branches of the decision tree will not be traversed giving a value of 0 for a "N" branch. For example, if BMI>20 and Height<135 cm are "Y", the decision tree 600 would traverse to weight value $W_1$=0.7, and all other decision branches will be "N" making $W_2$, $W_3$ and $W_4$=0. That is, for the linear expression, $W_2$×0=0, $W_3$×0=0, and $W_4$×0=0. Thus, for this branch, using the linear expression of FIG. 6B the score would equal 0.7. In other examples, as shown in FIGS. 7F-7J, multiple trees can be traversed to different weight values across multiple trees.

Figures 5A, 5B:
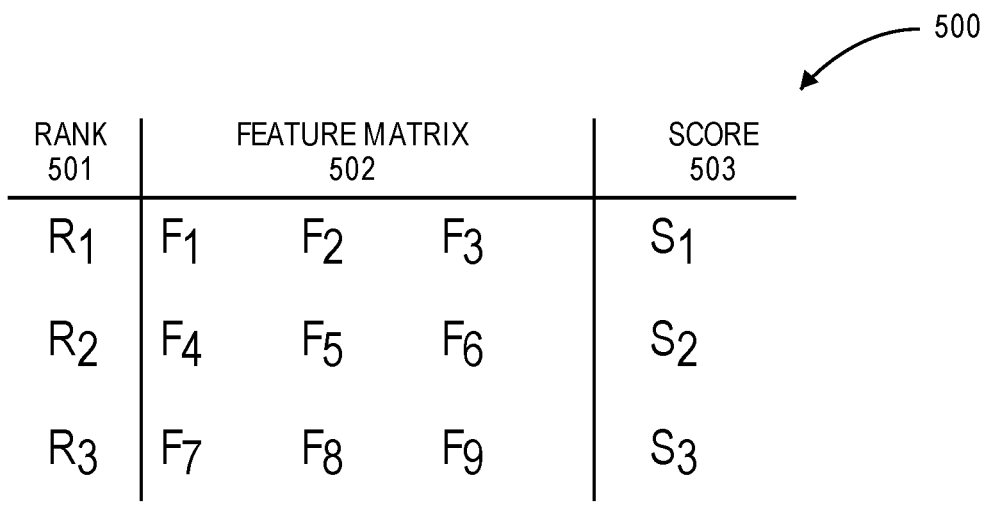
FIG. 5A is one example of a search index ranker table showing a feature matrix with rank and score.
FIG. 5B are examples of linear expressions for the feature matrix of FIG. 5A.

FIG. 5A is one example of search index ranker table 500 showing a feature matrix 502 with rank 501 and score 503. Referring to FIG. 5A, in one example, three rows for ranking three linear expressions are shown. The exemplary feature matrix 502 (shown below) includes three rows of features $F_1$-$F_3$, $F_4$-$F_6$ and $F_7$-$F_9$. Any number of features and rows of features can be part of feature matrix 502. Each feature can include one or more classification labels, e.g., BMI>20, forming a decision tree.

| Example Feature Matrix | | |
|---|---|---|
| $F_1$ | $F_2$ | $F_3$ |
| $F_4$ | $F_5$ | $F_6$ |
| $F_7$ | $F_8$ | $F_9$ |

In one example, the first row of features $F_1$-$F_3$ in feature matrix 502 can form a decision tree where the weights for the features are tallied to provide a score $S_1$ and likewise the second row and third row of features of feature matrix 502 provide a score $S_2$ and $S_3$. The scores $S_1$-$S_3$ in score 503 can be ranked accordingly with $R_1$-$R_3$ in rank 501. In one example, for a search engine, indexed page(s) or document(s) falling under decision tree in the first row of the feature matrix $F_1$-$F_3$ can be ranked R1 and displayed to a user in response to a search query. Likewise, page(s) or document(s) falling under decision trees in the second and third rows of feature matrix 502 can be ranked $R_2$ and $R_3$ and displayed to a user in response to a search query. In other examples, other ranking criteria can be implemented on documents falling under decision trees relating to feature matrix 502.

Referring to FIG. 5B, an example of the basic model for linear expressions 507 is shown below.

Basic Model for Linear Expressions $$S_1 = (W_1) \times F_1 + (W_2) \times F_2 + (W_3) \times F_3 \quad 508$$

$$S_2 = (W_4) \times F_4 + (W_5) \times F_5 + (W_6) \times F_6 \quad 509$$

$$S_3 = (W_7) \times F_7 + (W_8) \times F_8 + (W_9) \times F_9 \quad 510$$

In this example, the features $F_1$-$F_3$ are Boolean terms and $S_1$ 508 can be calculated as $(W_1) \times F_1 + (W_2) \times F_2 + (W_3) \times F_3$ or $S_1 = (W_1) \times F_1 + (W_2) \times F_2 + (W_3) \times F_3$ which can represent a linear expression of a decision tree. In one example, the linear expressions can be expressed as, e.g., $(W_1) \times F_1 + (W_2) \times F_2 + (W_3) \times F_3$ or $S_1 = (W_1) \times F_1 + (W_2) \times F_2 + (W_3) \times F_3$ and generated by a training server and transmitted to a search engine as a string. In one example, if a feature or decision tree is modified, the linear expressions can be modified accordingly and transmitted to a search engine. The search engine can input the linear expressions tally scores to determine ranking and rank page(s) and document(s) accordingly.

Figures 7A, 7B:
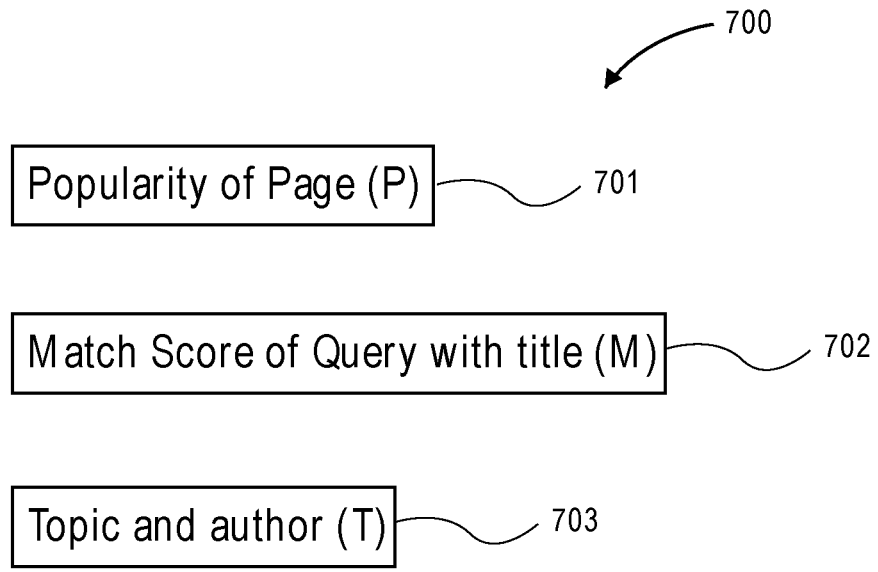
FIG. 7A is one example of features used for ranking page(s) or document(s) of a search query by a search engine.
FIG. 7B is one example of feature tree values, rank and score for the exemplary features of FIG. 7A.

FIG. 7A is one example of features 700 used for ranking page(s) or document(s) of a search query by a search engine.

In one example, the search query can be for finding book, e.g., mystery book. Example features 700 can include [Popularity of Page (P)] 701, [Match Score of Query with title (M)] 702 and [Topic and author (T)] 703. In one example, a search can identify the variable P M and T with respective features. In one example, features 701-703 can be indices for searching page(s) and document(s) by a search engine. In one scenario, a user can input a search query for a book and a search engine can use linear expressions for features 700 to rank results, e.g., top three results 1, 2, and 3.

Referring to FIG. 7B, one example of a search index ranker table 710 showing feature tree values 712, rank 711 and score 713 for the exemplary features P, M and T of FIG. 7A. The table includes three rows for ranking top 3 search results. In the feature tree values 712, each score under features P M T represents a tallied score of a corresponding decision tree that can be represented by a linear expression. In one example, a single decision tree for each of the features P M T can be traversed to obtained a weight value as shown in FIGS. 7C-7E and, in other examples, multiple decision trees can be traversed to obtain a weight value as shown in FIGS. 7F-7J.

| Example Feature Tree Values | | |
|---|---|---|
| P | M | T |
| 12 | 2.4 | 0.9 |
| 2.1 | 4.0 | 0.0 |
| 1.0 | 1.0 | 0.0 |

Figure 7C:
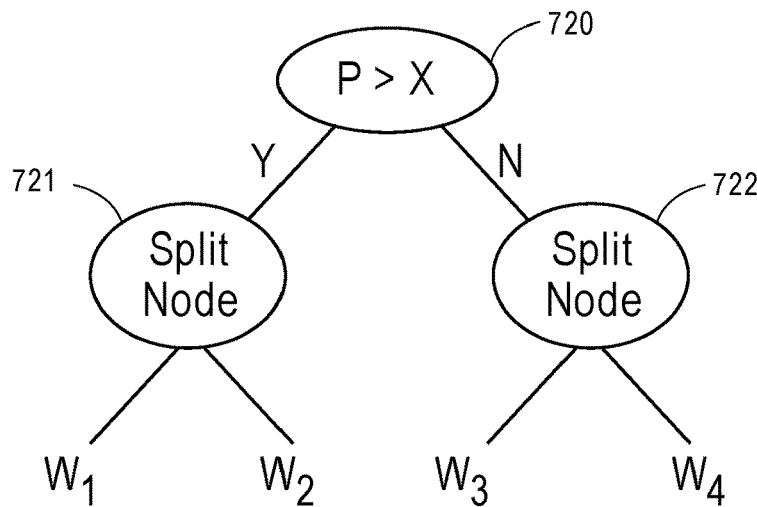
FIGS. 7C-7E are example decision trees for feature tree values of FIGS. 7A-7B.
Figure 7D:
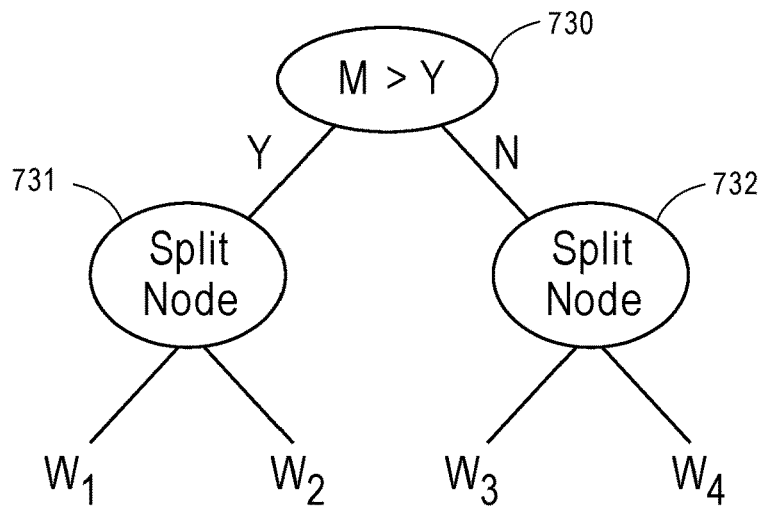
Figure 7E:
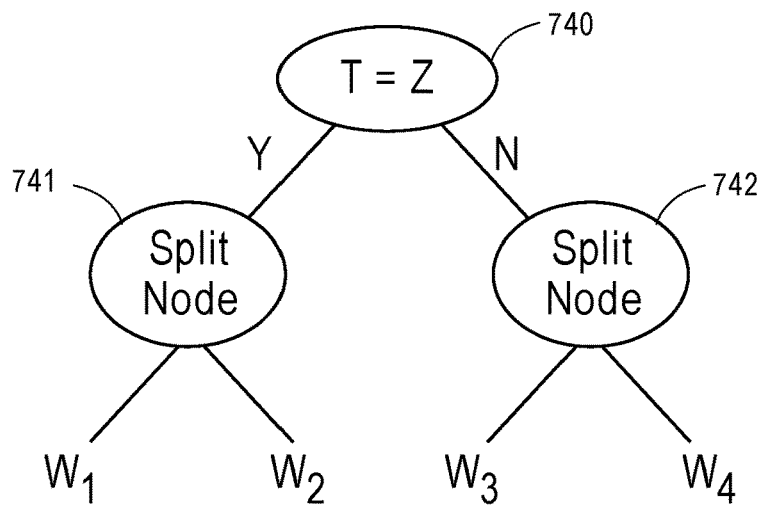

FIG. 7C-7E are example decision trees for feature tree values of FIGS. 7A-7B. For example, referring to FIG. 7C using the first row of the table, the score "12" can be derived from a decision tree having a root node 720 with the feature label "P>X" where X can be any value for a popularity score. The branches Y and N can have respective split nodes 721 and 722 with branches Y and N providing leading to weight values $W_1$ to $W_4$. In this example, the decision tree can be traversed down any of the branches to weight values $W_1$ to $W_4$ such that one of the weight values can be equal 12. For example, if the search result traverses the decision tree from root node 720 to split node 721 to weight $W_1$, the weight value can be given a value of 12. The split nodes 721 and 722 can be any type of Boolean feature label to further classify items under P>X example. Referring to FIG. 7D, the decision tree includes root node 730 with an example feature label "M >Y" having branches Y and N to split nodes 731 and 732 which can also be any type of Boolean feature label to further classify items under M>Y having branches Y and N for weights $W_1$ to $W_4$. Depending how the search result traverses the decision tree, one of the weights can provide a value of 2.4. Referring to FIG. 7E, the decision tree includes root node 740 with an example feature label "T=Z" having branches Y and N to split nodes 741 and 742 which can also be any type of Boolean feature label to further classify items under T=Z having branches Y and N for weights $W_1$ to $W_4$. And depending how the search result traverses the decision tree, one of the weights can provide a value of 0.9. In one example, the P M T values of 12, 2.4 and 0.9 can be added to provide a score for a search result of 15.3 which can be the highest rank search result.

In one example, the weights can provide different values depending on how the decision trees are traversed providing P M T values for search result ranked 2 as 2.1, 4.0, 0.0 providing as score of 6.1 and for search result 3 as 1.0, 1.0, 0.0 providing a score of 2.

In one example, for the search result ranked 1, the linear expressions for the P M T decision can trees can be expressed as a string: $W_1 \times [(P>X) \times (\text{Split Node } 721 \text{ True})] + W_2 \times [(P>X) \times (\text{Split Node } 721 \text{ False})] + W_3 \times [(P<=X) \times (\text{Split Node } 722 \text{ True})] + W_4 \times [(P<=X) \times (\text{Split Node } 722 \text{ False})]$; $W_1 \times [(M>Y) \times (\text{Split Node } 731 \text{ True})] + W_2 \times [(M>Y) \times (\text{Split Node } 731 \text{ False})] + W_3 \times [(M<=Y) \times (\text{Split Node } 732 \text{ True})] + W_4 \times [(M<=Y) \times (\text{Split Node } 732 \text{ False})]$; $W_1 \times [(T=Z) \times (\text{Split Node } 741 \text{ True})] + W_2 \times [(T=Z) \times (\text{Split Node } 741 \text{ False})] + W_3 \times [(T \neq X) \times (\text{Split Node } 742 \text{ True})] + W_4 \times [(T \neq X) \times (\text{Split Node } 742 \text{ False})]$.

The decision tree in FIG. 7C-7E can be represented as linear expressions as described herein and transmitted as a string as shown above. In one example, the weights can provide different values depending on how the decision trees are traversed providing P M T values for search result ranked 2 as 2.1, 4.0, 0.0 providing as score of 6.1 and for search result 3 as 1.0, 1.0, 0.0 providing a score of 2. The linear expressions can be transmitted to a search engine on one or more servers or computers that can input the expressions to ranking algorithm as variable including Boolean terms. In one example, the ranking algorithms can tally scores as shown in search index ranker table 710 and items falling under the decision trees for P M T can be ranked 1, 2, and 3. The items can include page(s) or document(s) for the search results of a search query, e.g., in finding a book. Decision trees and linear expressions can be modified and modified linear expressions can be transmitted to search engines for updated decision trees.

Figure 7F:
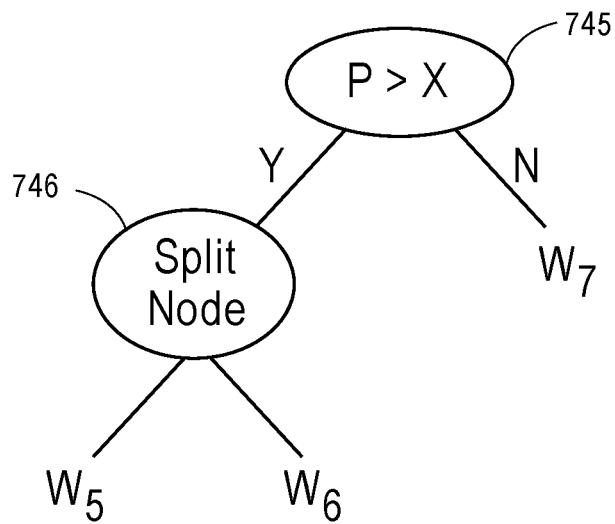
FIGS. 7F-7J are examples of multiple decisions trees which can be traversed for features of FIG. 7A to weighted values.
Figure 7G:
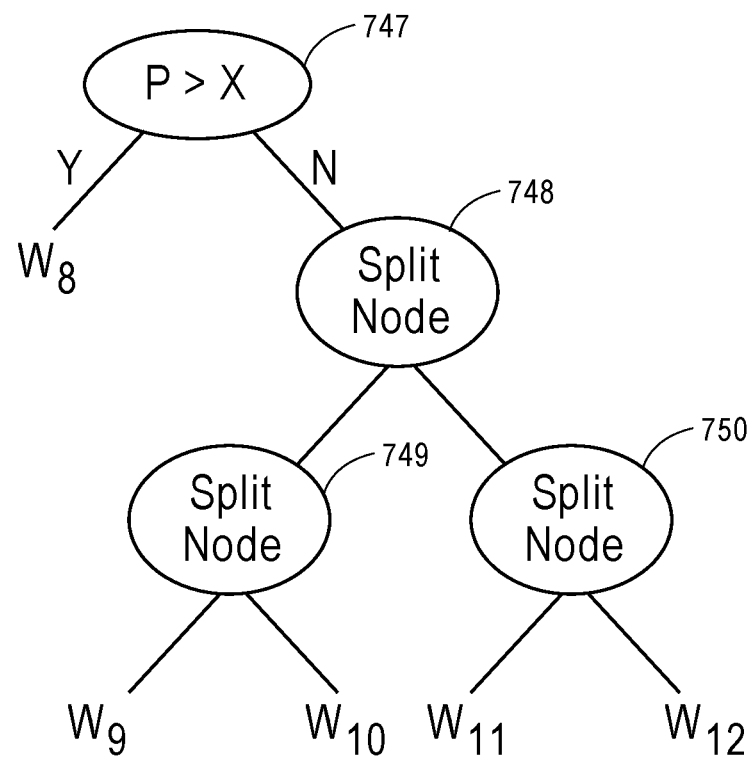
Figure 7H:
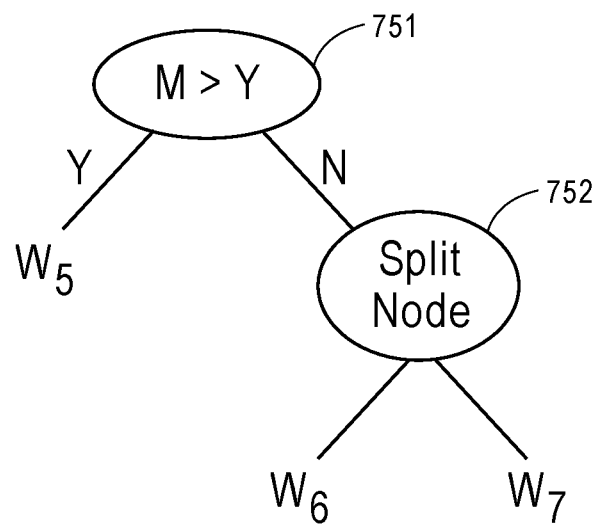
Figure 7I:
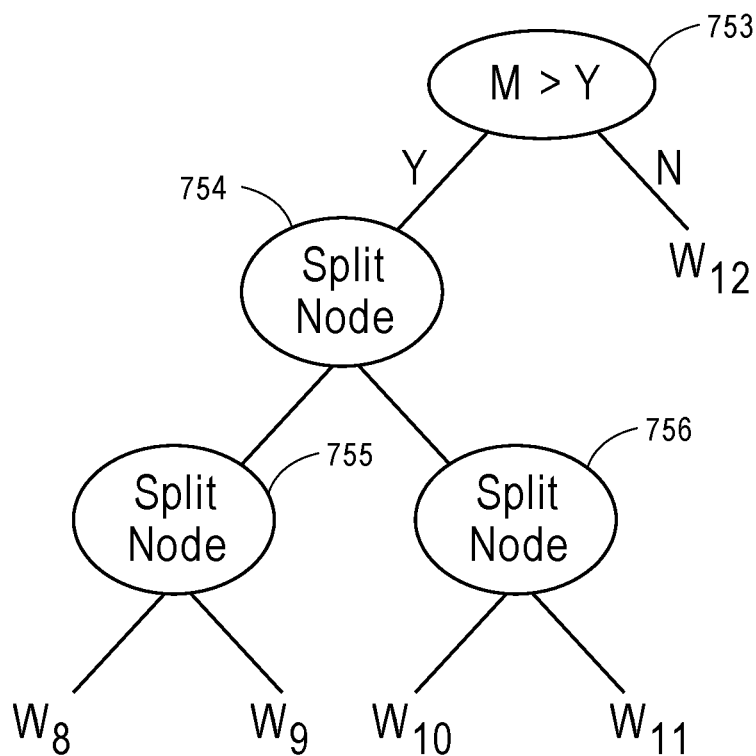
Figure 7J:
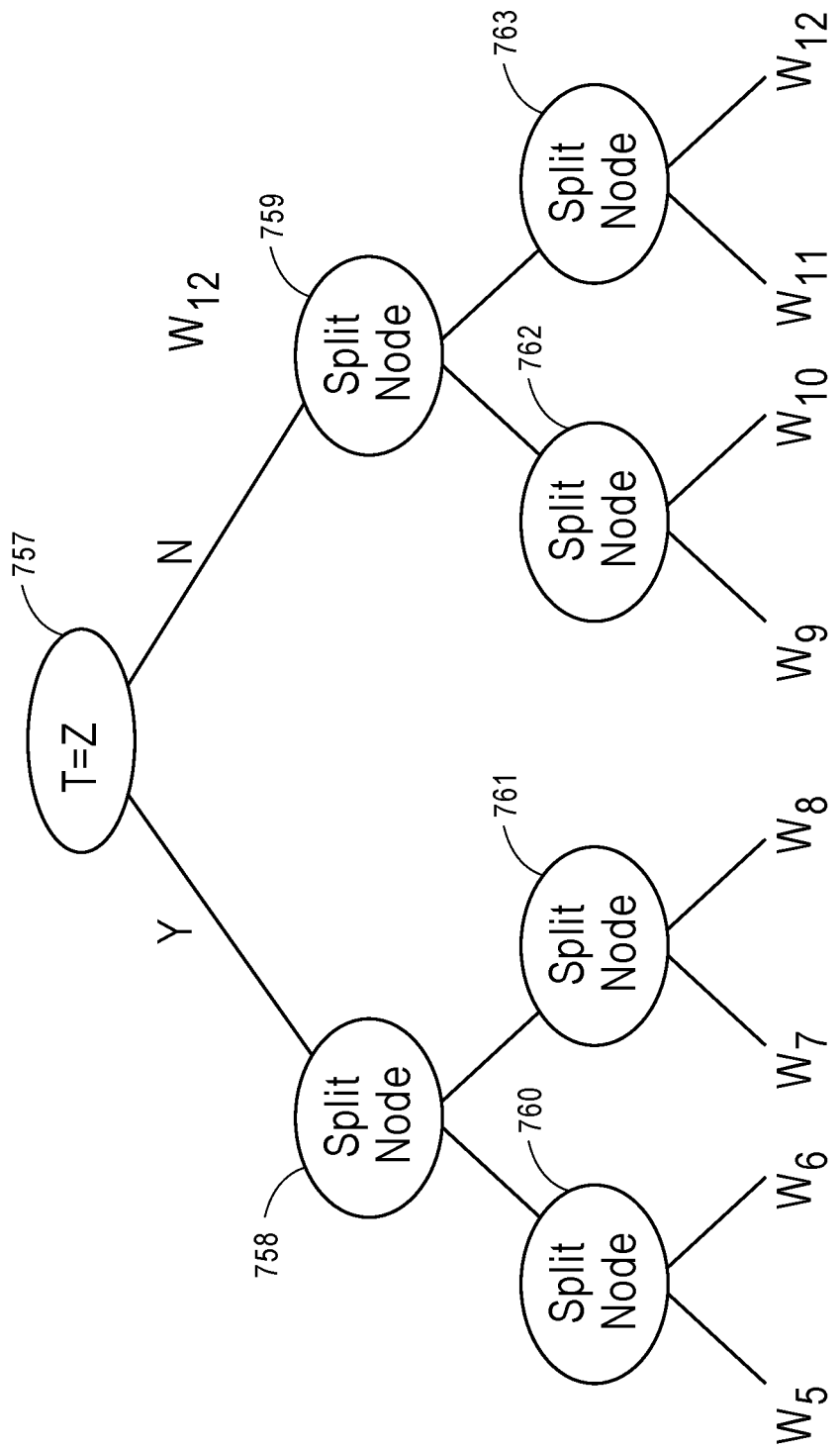

FIGS. 7F-7I are examples of multiple decisions trees which can be traversed for features of FIG. 7A to weighted values. Referring to FIGS. 7F and 7G, for the feature P, two additional decision trees can be traversed to obtain different weight values. For example, in FIG. 7F, decision tree can have a root node 745 (P>X) and a branch (N) leading to weight $W_7$. And for branch (Y) the branch can lead to a split node 746 which can be a Boolean feature, e.g., is result a comic book, whose true and false branches lead to weights $W_5$ and $W_6$. Referring to FIG. 7G, another decision tree can have a root node 747 having a branch for Y to weight $W_8$, and a branch for N to split node 748. Split node 748 can lead to two other split nodes 749 and 750, each of the split nodes 748-750 can be Boolean features, whose branches lead to weight values $W_9$ to $W_{12}$. In one example, for the P feature (P>X), multiple decision trees can be traversed having a linear expression, e.g., combining the decision trees of FIGS. 7C, 7F and 7G, as: $W_1 \times [(P>X) \times (\text{Split Node } 721 \text{ True})] + W_2 \times [(P>X) \times (\text{Split Node } 721 \text{ False})] + W_3 \times [(P<=X) \times (\text{Split Node } 722 \text{ True})] + W_4 \times [(P<=X) \times (\text{Split Node } 722 \text{ False})] + W_5 \times [(P>X) \times (\text{Split Node } 746 \text{ True})] + W_6 \times [(P>X) \times (\text{Split Node } 746 \text{ False})] + W_7 \times [(P<=X)] + W_8 \times [(P>X)] + W_9 \times [(P<=X) \times (\text{Split Node } 748 \text{ True}) \times (\text{Split Node } 749 \text{ True})] + W_{10} \times [(P<=X) \times (\text{Split node } 748 \text{ True}) \times (\text{Split Node } 749 \text{ False})] + W_{11} \times [(P<=X) \times (\text{Split Node } 748 \text{ False}) \times (\text{Split Node } 750 \text{ True})] + W_{12} \times [(P<=X) \times (\text{Split Node } 748 \text{ False}) \times (\text{Split Node } 750 \text{ False})]$. FIGS. 7H and 7I show multiple decision trees for the Boolean feature M (M>Y) which can lead to weight values W5 to W12 based on traversing the different branches of split nodes 751 to 756 of the different decision trees. FIG. 7J shows another decision tree for the Boolean feature (T=Z) which can lead to weight values W5 to W12 across a tree of split nodes 758 to 763 and branches. The linear expressions for the added decision trees can be added in the same was as FIGS. 7C, 7F and 7G detailed above.

Figure 8:
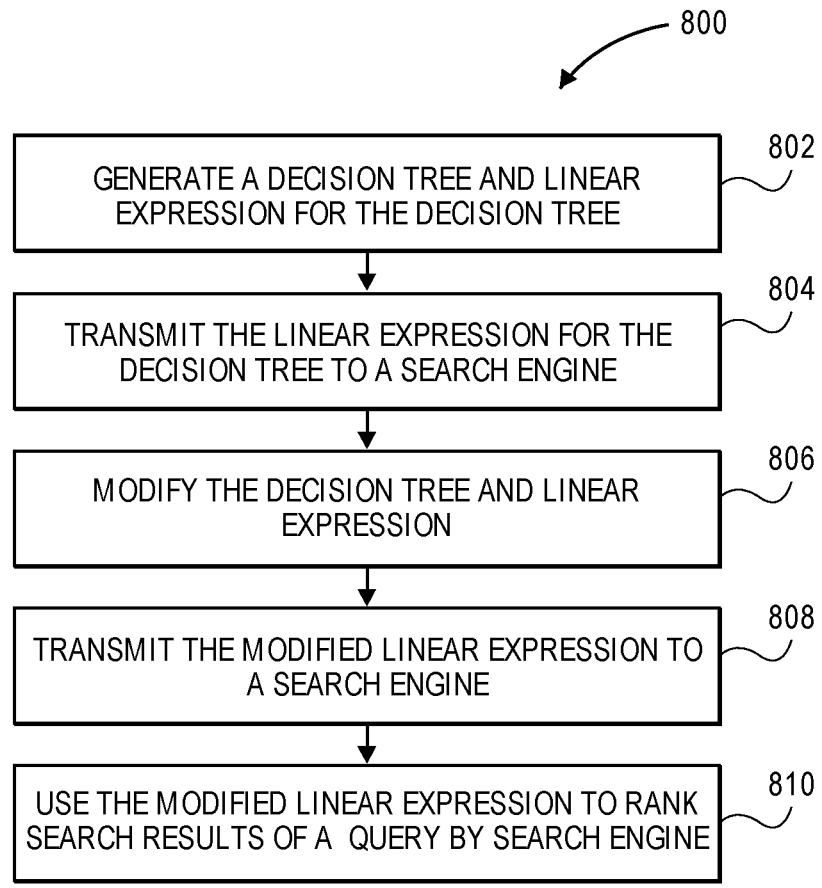
FIG. 8 is one example operation in a system of computers using linear expression by a search engine.

FIG. 8 is one example operation 800 in a system of servers using linear expression by a search engine. Referring to FIG. 8, operation 800 includes operations 802, 804, 806, 808 and 810. At operation 802, a decision tree and its linear expression is generated. At operation 804, the linear expression for the decision tree is transmitted to a search engine. At operation 806, the decision trees and linear expression are modified. At operation 808, the modified linear expression for the modified decision tree is transmitted to a search engine. At operation 810, a search engine uses the modified linear expression. Linear expressions for multiple decision trees can be generated at one or more server or computer and sent to a receiving server or computer for use to generate multiple ML decision trees. A receiving server or computer can interpret a linear expression to determine how to use values specified in the linear expression to construct a decision tree.

In the foregoing specification, specific examples and exemplary embodiments have been disclosed and described. It will be evident that various modifications may be made to those examples and embodiments without departing from the broader spirit and scope set forth in the following claims. The specification and drawings are, accordingly, to be regarded in an illustrative sense rather than a restrictive sense.

What is claimed is:

1. A method for a computer comprising:
generating a decision tree for ranking search results for a machine learning (ML) model;
converting the decision tree into a linear expression including Boolean terms;
transmitting the linear expression to one or more search computers, wherein the one or more search computers use the linear expression directly to rank search results;
modifying the ML model and the decision tree;
converting the modified decision tree into a modified linear expression; and
transmitting the modified linear expression to the one or more search computers, wherein the one or more search computers use the linear expression or the modified linear expression to rank search results without modifying rank algorithms at the one or more search computers.

2. The method of claim 1, wherein the decision tree or modified decision tree includes one or more nodes, each node is associated with one or more features.

3. The method of claim 2, wherein the linear expression or modified linear expression represents the decision tree or modified decision tree.

4. A method for a search server having a search engine comprising:
receiving a linear expression including Boolean terms representing a decision tree;
processing a search query by the search engine directly using the linear expression representing the decision tree to rank search results for the search query;
receiving a modified linear expression including Boolean terms representing a modified decision tree; and
processing a search query by the search engine using the modified linear expression representing the modified decision tree to rank search results for the search query, wherein the linear expression or the modified linear expression are used to rank search results without modifying rank algorithms at the search engine.

5. The method of claim 4, further comprising:
calculating a score for the linear expression or modified linear expression; and
ranking the linear expression or modified linear expression based on the score.

6. The method of claim 5, wherein the search results are ranked based on the ranked linear expression or modified linear expression.

7. A computing system comprising:
a network interface;
a memory storing linear expressions representing decision trees; and
a processor coupled to the memory and network interface and configured to:
transmit the linear expressions from the network interface to a search engine, wherein the search engine is to use the linear expressions directly to rank search results of a search query;
generate modified decision trees for a modified ML model and convert the modified decision trees to modified linear expressions; and
transmit the modified linear expression to the search engine, wherein the linear expression or the modified linear expression are used to rank search results without modifying rank algorithms at the search engine.

8. The computing system of claim 7, wherein the processor is further configured to train one or more machine learning (ML) models to generate the decision trees and convert the decision trees to the linear expressions.

9. The computing system of claim 7, wherein the search engine is to use the modified linear expressions to rank search results of a search query.

10. The computing system of claim 7, wherein the decision trees or modified decision trees include one or more nodes, each node is associated with one or more features.

11. The computing system of claim 7, wherein the linear expressions or modified linear expressions represent the decision trees or modified decision trees.

12. A search server having a search engine comprising:
means for receiving a linear expression including Boolean terms representing a decision tree;
means for processing a search query by the search engine using the linear expression representing the decision tree directly to rank search results for the search query;
means for receiving a modified linear expression including Boolean terms representing a modified decision tree; and
means for processing a search query by the search engine using the modified linear expression representing the modified decision tree to rank search results for the search query, wherein the linear expression or the modified linear expression are used to rank search results without modifying rank algorithms at the search engine.

13. The search server of claim 12, further comprising:
means for calculating a score for the linear expression or modified linear expression; and
means for ranking the linear expression or modified linear expression based on the score.

14. The search server of claim 13, wherein the search results are ranked based on the ranked linear expression or modified linear expression.

15. A non-transitory machine-readable medium, including instructions, which if executed by a data processing system, causes the data processing system to perform a method comprising:
generating a decision tree for ranking search results for a machine learning (ML) model;

converting the decision tree into a linear expression including Boolean terms;

transmitting the linear expression to one or more computers, wherein the one or more computers use the linear expression directly to rank search results;

modifying the ML model and decision tree;

converting the modified decision tree into a modified linear expression; and transmitting the modified linear expression to one or more computers, wherein the one or more search computers use the linear expression or the modified linear expression to rank search results without modifying rank algorithms at the one or more computers.

16. The method of claim 1, wherein the linear expression is input to a ranking algorithm to rank search results for a search query at the one or more search computers.

17. The method of claim 1, wherein the linear expression is program agnostic.

* * * * *